(12) United States Patent
Mabrouki

(10) Patent No.: US 6,278,863 B1
(45) Date of Patent: Aug. 21, 2001

(54) SYSTEM FOR EXCHANGING DATA BETWEEN A PORTABLE PAYMENT TERMINAL AND A STATIONARY BASE TERMINAL

(75) Inventor: Benazzouz Mabrouki, Nanterre (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/219,969

(22) Filed: Dec. 23, 1998

(30) Foreign Application Priority Data

Dec. 24, 1997 (FR) .................................................. 97 16473

(51) Int. Cl.⁷ .................................................. H04B 1/10
(52) U.S. Cl. .............................................. 455/63; 455/501
(58) Field of Search .................................. 705/35, 39, 40, 705/1; 370/409, 522, 230, 236; 455/26, 63, 501; 709/227, 229

(56) References Cited

U.S. PATENT DOCUMENTS

| | | |
|---|---|---|
| 4,034,195 | 7/1977 | Bates . |
| 4,454,601 * | 6/1984 | Helms et al. ........................... 371/34 |
| 4,727,537 * | 2/1988 | Nichols ................................... 370/85 |
| 4,814,581 | 3/1989 | Mara et al. . |
| 5,031,098 * | 7/1991 | Miller et al. .......................... 364/405 |
| 5,202,825 * | 4/1993 | Miller et al. .......................... 364/405 |
| 5,387,784 * | 2/1995 | Sarradin ................................. 235/380 |
| 5,420,405 | 5/1995 | Chasek . |
| 5,422,807 | 6/1995 | Mitra et al. . |
| 5,479,441 * | 12/1995 | Tymes et al. .......................... 375/200 |
| 5,568,476 * | 10/1996 | Sherer et al. ............................ 370/60 |
| 5,771,008 * | 6/1998 | Hayashi et al. ....................... 340/905 |
| 5,802,314 * | 9/1998 | Tullis et al. ....................... 395/200.76 |
| 5,838,931 * | 11/1998 | Reganold et al. .................... 395/308 |
| 5,874,315 * | 2/1999 | Kraft et al. ............................ 436/176 |

FOREIGN PATENT DOCUMENTS

WO 97/15154 4/1997 (WO) .

OTHER PUBLICATIONS

Steve Rigney, Pump it up (tips to improve LAN performance), Computer Shopper, v16, n5,p617(3), May 1996.*
Bob Murphy, National Data tunes in digital radio networks system of credit card verification, Lexis–Nexis, May 16, 1990.*
Link–Up, Communications card transfers files at night,v6, n4, p29(1), Jul. 1, 1989.*

* cited by examiner

Primary Examiner—Robert W. Downs
Assistant Examiner—Pedro Kanof
(74) Attorney, Agent, or Firm—Frishauf, Holtz, Goodman, Langer & Chick, P.C.

(57) ABSTRACT

A system for exchanging data between a portable payment terminal and a stationary base terminal in communication with a payment center. The portable terminal and the base terminal each include a central unit and a radio transmit-receive module. Each central unit is adapted to generate/read binary messages transmitted/received in the form of radio waves by the transmit-receive module. The portable payment terminal or the stationary base terminal include means for storing the binary messages and means for deactivating the central unit such that the radio transmit-receive module is operable only when the central unit is deactivated.

20 Claims, 2 Drawing Sheets

SYSTEM FOR EXCHANGING DATA BETWEEN A PORTABLE PAYMENT TERMINAL AND A STATIONARY BASE TERMINAL

FIELD OF THE INVENTION

The present invention concerns a system for exchanging data between a portable payment terminal and a stationary base terminal which is capable of being in communication with a payment center. The invention finds one particularly advantageous application in the field of electronic transactions effected by means of an electronic memory card operable with a portable payment terminal.

BACKGROUND OF THE INVENTION

At present many transactions are conducted, especially in stores and restaurants, in electronic form using a memory card, known as a bank card, incorporating a microprocessor in a semiconductor chip. The memory card is inserted into the card reader of a portable payment terminal which can exchange transactional data with a stationary base terminal which is capable of being in communication with a payment center, usually via the public switched telephone network. The payment center processes the transactions transmitted to it and can grant or refuse a requested authorization.

The prior art includes systems for exchanging data between portable payment terminals and stationary base terminals in which a portable terminal and the associated base terminal each includes a central unit and a radio transmit-receive module. The central unit of the portable terminal is able to generate binary messages to be transmitted to the base terminal, with the messages including the amount of the transaction, the identity of the customer and the identity of the trader, for example. The messages are transmitted to the base terminal by radio via the radio transmit-receive module of the portable terminal. The base terminal can transmit binary messages to the portable terminal using its radio transmit-receive module, for example, to authorize or to cancel a transaction.

The above prior art data exchange systems operate in the following manner, but it must be understood that the roles of the portable terminal and the base terminal are totally symmetrical. During transmission, the central unit and the radio transmit-receive module of whichever terminal is transmitting operate simultaneously in the sense that the data received from the central unit is transmitted to the receiving terminal by the transmit-receive module as and when it arrives. Switching in the central unit during the generation of binary messages causes electromagnetic interference at the transmit-receive module, in particular at the antenna, thereby producing noise in the transmit band. However, in this case such interference has only a slight effect on the signal being transmitted given that the signal is amplified to a relatively high level.

During reception, on the other hand, operation of the central unit of the receiving terminal to read the binary messages as they are received by the radio transmit-receive module causes a relatively higher level of interference because the signal received can be at a low level, in particular when there is a relatively great distance between the portable terminal and the base terminal. The noise generated by the central unit of the receiving terminal then renders the signal from the transmitting terminal virtually unusable, and this limits the range of the system.

SUMMARY OF THE INVENTION

Accordingly, one object of the present invention is to prevent any interference in operation between the central unit and the transmit-receive module so as to provide a maximum signal-to-noise ratio of the signal transmitted or received by the module.

In accordance with one aspect of the present invention, the portable payment terminal and/or the stationary base terminal includes means for storing the binary messages and means for deactivating the central unit such that the radio transmit-receive module is operable only when the central unit is deactivated.

Accordingly the central unit and the transmit-receive module operate sequentially rather than simultaneously and the module is no longer subject to interference generated by the central unit. The signal-to-noise ratio of the transmit-receive module is significantly improved, especially when receiving, with the advantage of enabling the system arranged in accordance with the invention to operate with a greater distance between the portable terminal and the base terminal.

In one advantageous embodiment of the data exchange system in accordance with the invention, the binary messages are written into the storage means at a transmission speed higher than the transmission speed of the radio link between the portable payment terminal and the stationary base terminal. This minimizes the increase in the transmission time between the two central units due to the fact that the central units and the transmit-receive modules operate sequentially rather than simultaneously.

BRIEF DESCRIPTION OF THE DRAWINGS

FIG. 2b is a block diagram of a radio transmit-receive module adapted to co-operate with the central unit shown in FIG. 2a.

DETAILED DESCRIPTION OF THE INVENTION

Figure 1:
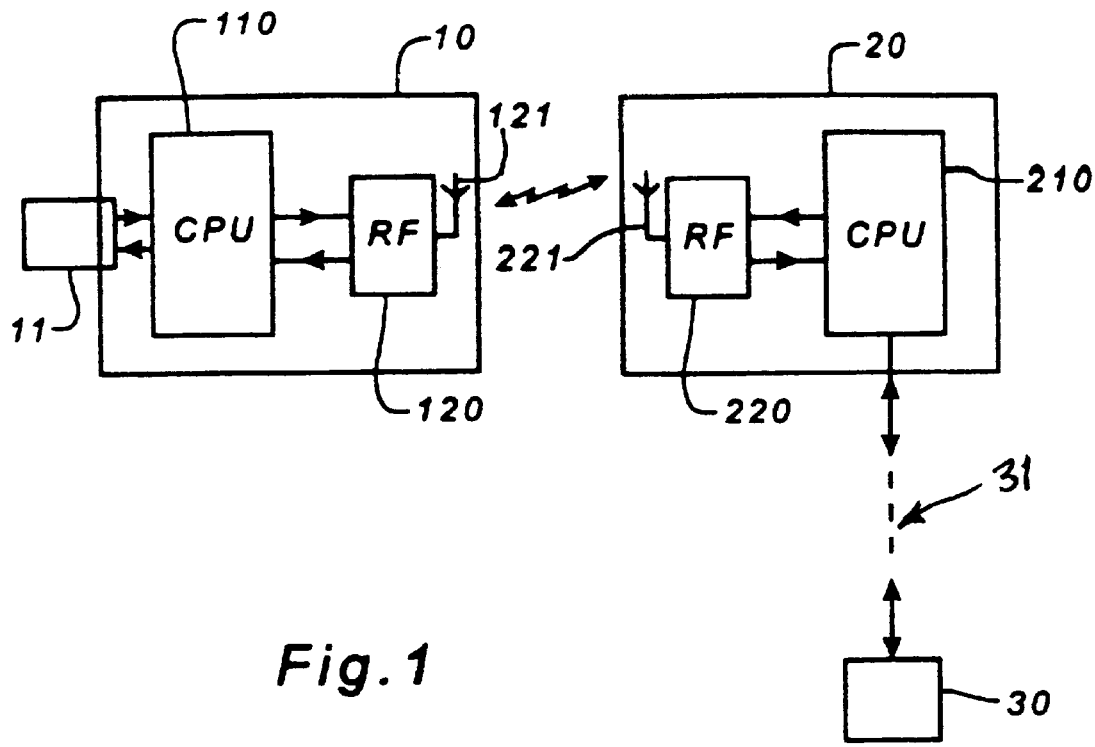
FIG. 1 is a diagrammatic representation of a data exchange system in accordance with the invention.

FIG. 1 is a diagrammatic representation of a system for exchanging data between a portable payment terminal 10 adapted to receive an electronic memory card 11 and a stationary base terminal 20 in communication with a payment center 30 by a telephone network schematically represented by 31. The terminal 10 is equipped with a conventional card reader, not shown, so that it can read and transmit to the payment center 30 data identifying the holder of the card 11. The terminal 10 also includes a keypad, not shown, to manually enter data relating to the transaction being performed, in particular the amount of the transaction. All the data, in the form of binary messages, is transmitted over a radio channel to the stationary base terminal 20 that serves, so to speak, as a relay to the payment center 30, which is the final destination of the transactional data collected by the terminal 10. In return, the payment center transmits a transaction authorization message (for example) to the base terminal 20 which retransmits it to the terminal 10, again over the same radio channel.

To this end, the portable payment terminal 10 includes a central unit 110 for generating binary messages to be transmitted to the base terminal 20 and for reading binary messages received from the base terminal. The binary messages are transmitted and received by a radio transmit-receive module 120 which has an antenna 121.

In an entirely symmetrical fashion, the base terminal 20 includes a central unit 210 and a radio transmit-receive module 220 with an antenna 221.

Transmission or reception of binary messages by the modules 120, 220 of the portable terminal 10 or the base terminal 20 can suffer from interference due to switching associated with the respective central unit 110, 210 generating or reading binary messages. Such interference, which is particularly acute when receiving messages, limits the range of the system in that the portable terminal 10 cannot be moved too far away from the base terminal 20.

Figure 2A:
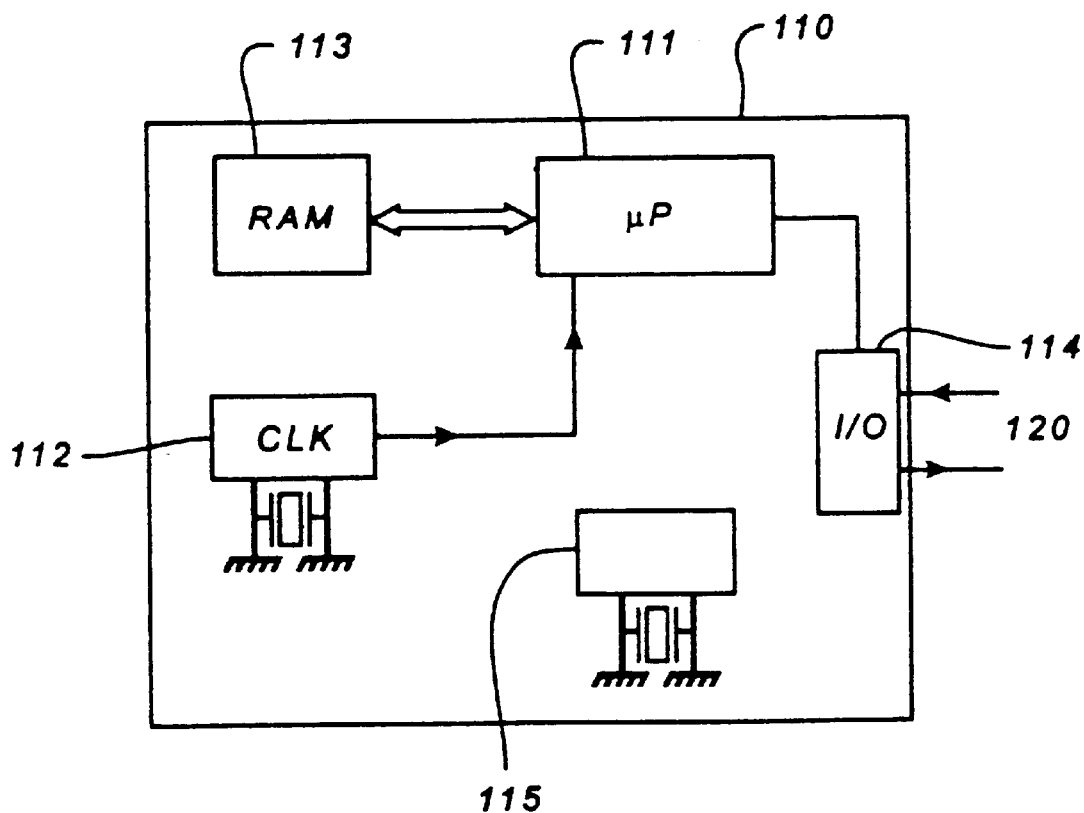
FIG. 2a is a block diagram of a central unit of the system shown in FIG. 1.
Figure 2B:
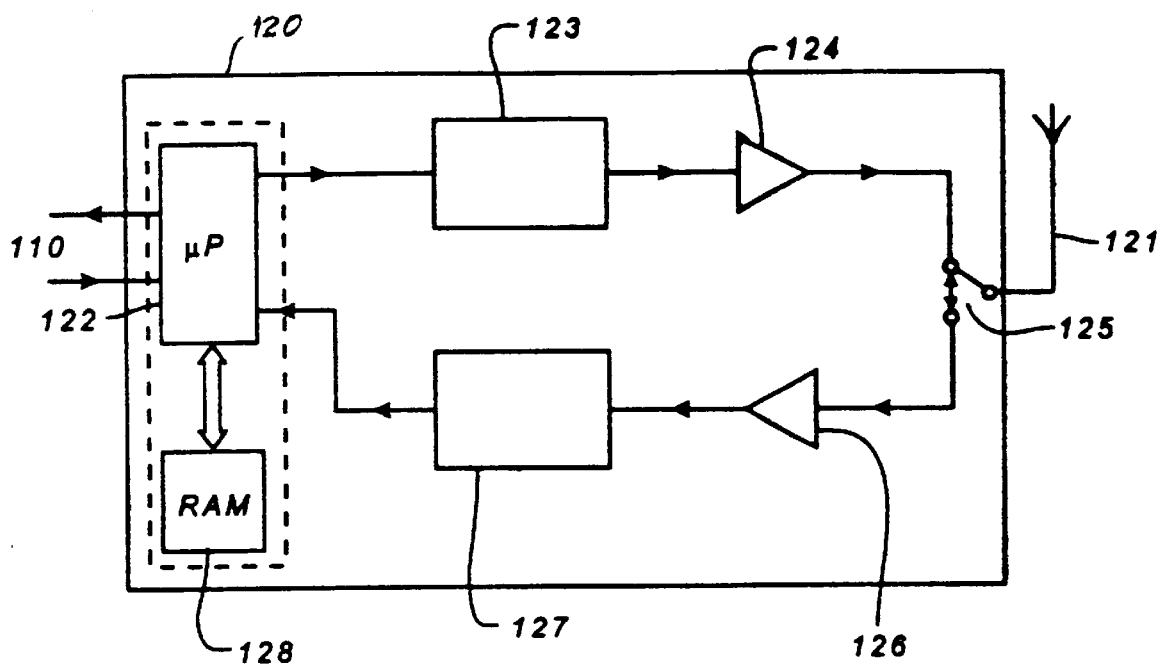

FIGS. 2a and 2b are respectively block diagrams of the central unit 110 and the radio transmit-receive module 120 of the portable terminal 10. The block diagrams of the equivalent units of the base terminal 20 are identical, and the arrangements described with reference to the portable terminal 10 apply equally to the base terminal 20.

FIG. 2a shows that the central unit 110 includes a microprocessor 111 timed by a clock 112 and exchanging data with a memory 113, the data coming either from the electronic card 11 shown in FIG. 1 or from the keypad of the portable payment terminal 10. The binary messages generated by the microprocessor 111 or received from the radio transmit-receive module 120 pass through a radio communication peripheral device 114 connected to the radio transmit-receive module 120.

The radio transmit-receive module 120 (see FIG. 2b) includes a microprocessor 122. For transmission, microprocessor 122 is connected to a modulation system 123 comprising a modulator, a filter and a voltage-controlled oscillator. This is followed by an amplifier 124 connected to the antenna 121 via a transmit/receive switch 125. For reception, the signal received from the antenna 121 is amplified by an amplifier 126 and then demodulated by a demodulator system 127 comprising a mixer, an intermediate frequency amplifier and a demodulator.

In conventional operation, for example in transmission, binary messages are transmitted by the radio transmit-receive module 120 as and when they are generated by the microprocessor 111 of the central unit 110. Because the microprocessor 111 and the module 120 operate simultaneously, switching in the microprocessor 111 generates noise in the module 120 and in particular at the antenna 121. This significantly degrades the signal-to-noise ratio, especially during reception.

To solve this problem, the radio transmit-receive module 120 of the portable terminal 10 includes means 128 for storing binary messages generated by the microprocessor 111 of the central unit 110. In the FIG. 2b example, the storage means 128 is a random access memory (RAM). As it receives messages from the microprocessor 111, the microprocessor 122 of the module 120 stores them in the memory 128. When the last message has been received, the microprocessor 111 of the central unit 110 is deactivated by purely software means which are well known, such as a HALT instruction in the program running on the microprocessor 111.

Because there is no activity in the microprocessor 111 after it is deactivated, the radio transmit-receive module 120 can transmit the binary messages stored in the memory 128 to the base terminal 20 under the best possible conditions.

When the messages have been transmitted, the microprocessor 111 is reactivated either by receiving an acknowledgment or a non-acknowledgment response from the base terminal 20 or at the end of a predefined time-delay if the transmission has not been completed because of poor reception by the base terminal, for example. This time-delay, established by the time and date unit 115 of the central unit 110, is at least equal to the time required to transmit a basic message; in other words the sum of the time to initialize the radio transmit-receive module 120, the time to transmit the message and the waiting time for the acknowledgment or non-acknowledgment response from the fixed base terminal 20, a total duration on the order of 100 ms to 150 ms.

To summarize, the data transmission sequence is as follows:

binary messages from the central unit 110 are stored in the memory 128 of the radio transmit-receive module 120, the microprocessor 111 of central unit 110 is deactivated, the messages are transmitted from the module 120 to the base terminal 20, the microprocessor 111 of central unit 110 is reactivated after a response from the base terminal 20 or after a predefined time-delay.

Similarly, the message receiving sequence is as follows:
the microprocessor 111 of central unit 110 is deactivated,
binary messages to the module 120 are received from the base terminal 20,
the microprocessor 111 of central unit 110 is reactivated after receiving all of the messages, the size of which is fixed either by a predefined maximum value (for example 40 bytes) or by a predefined time-delay indicating the end of the messages (for example 3 ms after the last bit is received).

FIG. 2b shows the memory 128 in the form of a discrete component associated with the microprocessor 122. It could also be integrated into the microprocessor.

The two-stage (storage then transmission) operation of the system in accordance with the invention theoretically doubles the communication time between the portable payment terminal 10 and the stationary base terminal 20. To minimize this increase it is advantageous to write the messages into the buffer memory 128 at a transmission speed higher than the transmission speed of the radio link between the portable payment terminal 10 and the stationary base terminal 20.

For example, instead of transmitting messages from the central unit 110 to the radio transmit-receive module 120 at 9,600 baud and using the same speed for the radio link between the module 120 and the base 20, a speed four times greater (38,400 baud) can be used for transmission from the central unit 110 to the module 120, this being possible because the link between the central unit and the module is a secure link. The central unit can read or write a block of 40 bytes in 10 ms rather than 40 ms.

Note that because of the presence of an electronic memory card 11 it is necessary for the clock 112 in central unit 110 to run continuously. However, the noise generated by the clock alone has little effect on radio transmission or reception. Also, this enables the central unit 110 to be reactivated faster as soon as data is received.

I claim:

1. A system for exchanging data comprising a portable payment terminal and a stationary base terminal, said portable payment terminal and said stationary base terminal each including a central unit and an associated radio transmit-receive module, each said central unit being adapted to generate/read binary messages transmitted/received in the form of radio waves by its said associated transmit-receive module, wherein at least one of said portable payment terminal and said stationary base terminal includes means for storing said binary messages and means for deactivating said central unit thereof such that its associated radio transmit-receive module operates to transmit/receive said binary messages only when said central unit is deactivated.

2. The system according to claim 1, wherein said binary messages are written into said storage means at a transmission speed higher than the transmission speed of the binary messages between the portable payment terminal and the stationary base terminal.

3. The system according to claim 1, wherein said central unit includes a microprocessor, and said means for deactivating the central unit deactivates said microprocessor.

4. The system according to claim 1 wherein said storing means is a random access memory.

5. A system for transmitting/receiving data comprising a portable payment terminal and a stationary base terminal each including a central unit and an associated radio transmit-receive module, said central unit of at least one of the payment terminal and the base terminal being deactivatable and being adapted to generate/read messages transmitted/received by said associated transmit-receive module, wherein said associated radio transmit-receive module operates to transmit/receive said messages only when said central unit is deactivated.

6. The system according to claim 5, further comprising means for deactivating said central unit and for operating said associated transmit-receive module to transmit/receive said messages only when said central unit is deactivated.

7. The system according to claim 6, wherein said central unit includes a microprocessor, and said means for deactivating said central unit deactivates said microprocessor.

8. The system according to claim 5, further comprising means for storing said messages.

9. The system according to claim 8, wherein said messages are written into said storing means at a transmission speed higher than the transmission speed of the messages between the portable payment terminal and the stationary base terminal.

10. The system according to claim 8, wherein said storing means is a random access memory.

11. A method of transmitting data between a portable payment terminal and a stationary base terminal adapted to communicate with a payment center, said portable payment terminal and said stationary base terminal each including a central unit and an associated radio transmit-receive module, the portable payment terminal including a memory for storing said binary messages and means for deactivating the central unit thereof, the method comprising the steps of:

generating binary messages in said central unit of said portable payment terminal;

storing said binary messages in said memory;

deactivating the central unit of the portable payment terminal; and operating the radio transmit-receive module of the stationary base terminal to transmit said binary messages in the form of radio waves from said portable payment terminal to said stationary base terminal only when said central unit of said portable payment terminal is deactivated.

12. The method according to claim 11, wherein said storing step further comprises writing the binary messages into said memory at a transmission speed higher than the transmission speed of the binary messages from the portable payment terminal to the stationary base terminal.

13. The method according to claim 11, wherein each said central unit includes a microprocessor, and wherein the deactivating step further comprises deactivating said microprocessor.

14. The method according to claim 11, wherein the operating step further comprises the steps of:

transmitting said binary messages from said radio transmit-receive module of the stationary base terminal to said payment center; and reactivating said central unit of the portable payment terminal after one of receiving a response from the base terminal or expiration of a predefined time delay.

15. The method according to claim 11 wherein the operating step further comprises the step of:

reactivating the central unit of the portable payment terminal after all of the binary messages have been sent from the stationary base terminal to the payment center or after the expiration of a predefined time-delay.

16. A method of transmitting data between a portable payment terminal and a stationary base terminal adapted to communicate with a payment center, said portable payment terminal and said stationary base terminal each including a central unit and an associated radio transmit-receive module, the stationary base terminal including a memory for storing said binary messages and means for deactivating the central unit thereof, the method comprising the steps of:

generating binary messages in said central unit of said stationary base terminal;

storing said binary messages in said memory;

deactivating the central unit of the stationary base terminal; and operating the radio transmit-receive module of the portable payment terminal to transmit said binary messages in the form of radio waves from said stationary base terminal to said portable payment terminal only when said central unit of said stationary base terminal is deactivated.

17. The method according to claim 16, wherein said storing step further comprises writing the binary messages into said memory at a transmission speed higher than the transmission speed of the binary messages from the stationary base terminal to the portable payment terminal.

18. The method according to claim 16, wherein each said central unit includes a microprocessor, and wherein the deactivating step further comprises deactivating said microprocessor.

19. The method according to claim 16, wherein the operating step further comprises:

reactivating said central unit of the stationary base terminal after one of receiving a response from the portable payment terminal or expiration of a predefined time delay.

20. The method according to claim 16 wherein the operating step further comprises:

reactivating the central unit of the stationary base terminal after all of the binary messages have been sent from the stationary base terminal to the portable payment terminal after the expiration of a predefined time-delay.

* * * * *